US006126217A

United States Patent [19]

Guadiana et al.

[11] Patent Number: 6,126,217

[45] Date of Patent: Oct. 3, 2000

[54] APPARATUS FOR INSPECTING A POCKET OF AN ARTICLE OF CLOTHING AND FOR RETRIEVING THE CONTENTS THEREOF

[76] Inventors: Alex Nickey Guadiana, 113 Placer St.; Alex S. Guadiana, 100 Carmel Ave.; Raymond J. Mikelionis, 203 Grove St., all of Roseville, Calif. 95678

[21] Appl. No.: 09/358,669

[22] Filed: Jul. 22, 1999

[51] Int. Cl.$^{7}$ .......... B25J 1/02

[52] U.S. Cl. .......... 294/24; 294/1.1; 294/26; 294/55

[58] Field of Search .......... 294/1.1, 19.1, 294/24, 26, 51, 55, 61; 7/114, 123, 151; 224/230, 914

[56] References Cited

U.S. PATENT DOCUMENTS

D. 49,731 10/1916 Harding .......... 7/123
D. 241,410 9/1976 Atkinson .......... 294/61
1,150,403 8/1915 Topham .......... 7/123
1,194,381 8/1916 Harding .......... 7/123
1,242,615 10/1917 Sommer .......... 7/123
2,449,535 9/1948 Scholl .......... 294/61
4,961,239 10/1990 Boyd, Sr. et al. .......... 7/151
5,161,842 11/1992 Beeler .......... 294/1.1
5,531,365 7/1996 Donnelly .......... 224/232
5,729,854 3/1998 Powers .......... 294/24
5,765,887 6/1998 Weichman et al. .......... 294/1.1

*Primary Examiner*—Dean J. Kramer
*Attorney, Agent, or Firm*—Thomas R. Lampe

[57] ABSTRACT

Apparatus for inspecting a pocket of an article of clothing and for retrieving the contents thereof includes a handle having a snagger member at one end thereof and a scoop member at the other end thereof. The handle includes two handle portions movable relative to one another. The snagger member includes a sharp projection which will snag a pocket liner to pull it inside out when the apparatus is pulled out of a pocket and the scoop member defines a recess for retaining contents of the pocket to extract the contents when the apparatus is pulled from the pocket.

4 Claims, 5 Drawing Sheets

Fig. 7
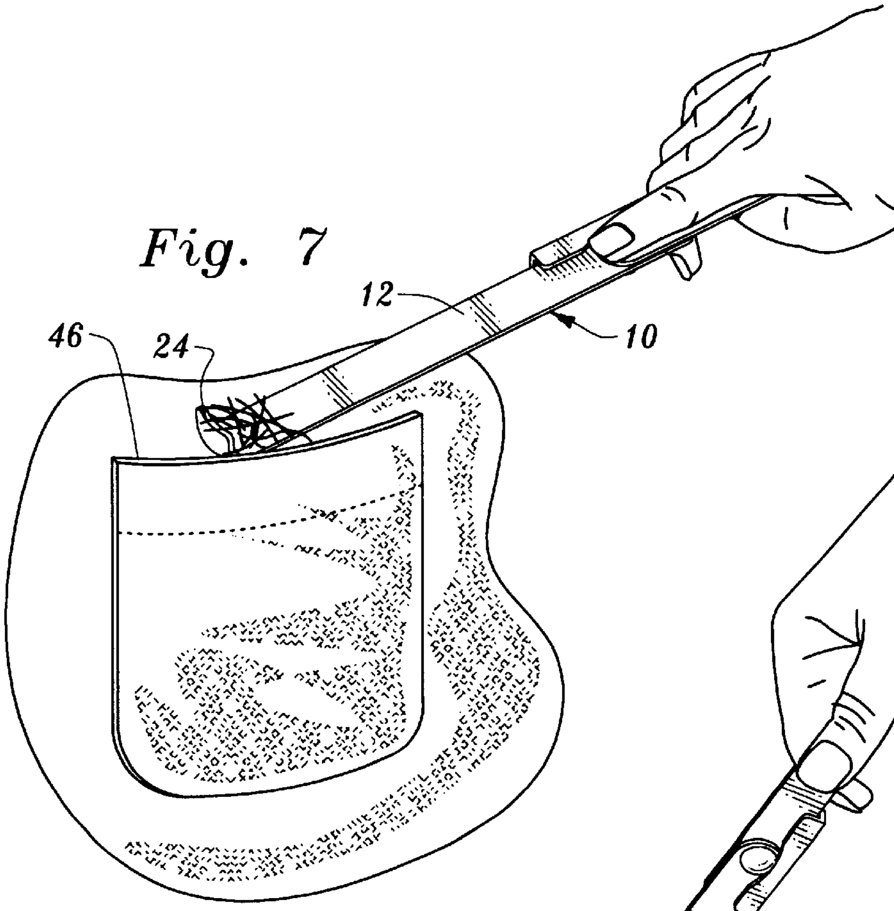
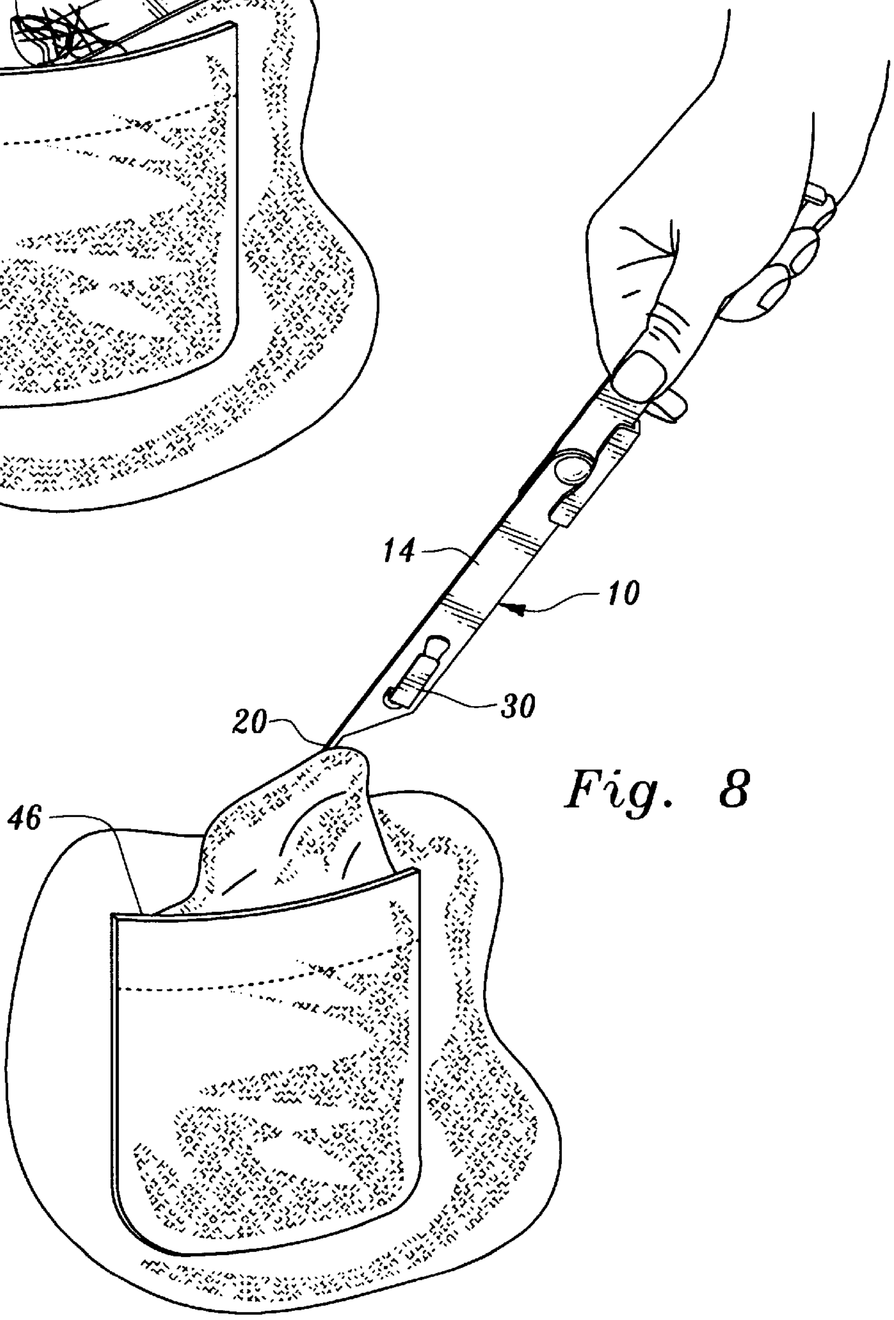
Fig. 8

APPARATUS FOR INSPECTING A POCKET OF AN ARTICLE OF CLOTHING AND FOR RETRIEVING THE CONTENTS THEREOF

TECHNICAL FIELD

This invention relates to apparatus for use by law enforcement officers and others for inspecting a pocket of an article of clothing and for retrieving the contents thereof. The apparatus also can be used to retrieve materials and objects from confined spaces other than pockets and to handle evidence.

BACKGROUND OF THE INVENTION

Persons placed under arrest are routinely searched for weapons, illegal substances and paraphernalia, or other evidence of criminal activity. Officers are often required to check the contents of pockets of a suspect's clothing. This is conventionally accomplished by the officer reaching into the pocket with his or her hand and manually retrieving the contents thereof. Reaching into a pocket or other confined space is a dangerous activity since needles, knives, razors or other objects can injure the officer. In the case of needles and other drug paraphernalia a pin prick or cut on the searcher's hand can be dangerous and even life threatening. For example, it is well known that needle punctures can transmit HIV. While gloves are often worn during pocket inspection, pin pricks or cuts can still occur. Also, if the glove is heavy or bulky it can interfere with the search procedure.

DISCLOSURE OF INVENTION

The present invention relates to apparatus of inexpensive construction which facilitates inspection of a pocket of an article of clothing as well as retrieval of the contents thereof. The apparatus is highly effective and can be used by police officers or others in a manner which will not expose the user to cuts, pin pricks, scratches or other injury. The apparatus can also be used to retrieve objects and material from other confined spaces and to handle evidence.

The apparatus includes a handle. A snagger member is attached to the handle for insertion into the interior of a pocket through a pocket opening. The snagger member is for snagging the pocket and for pulling the pocket through the pocket opening to position the pocket inside out externally of the pocket opening.

A scoop member is also attached to the handle for insertion into the interior of a pocket through a pocket opening. The scoop member is for scooping up the contents of the pocket into which it is inserted and retrieving the contents through the pocket opening.

The handle includes two pivotally connected handle portions, each handle portion having a distal end spaced from the location of pivotal connection therebetween. The snagger member is attached to the distal end of one of the handle portions and the scoop member is attached to the distal end of the other handle portion.

Other features, advantages, and objects of the present invention will become apparent with reference to the following description and accompanying drawings.

BRIEF DESCRIPTION OF DRAWINGS

FIG. 7 illustrates the scoop member of the embodiment of FIGS. 1–3 being utilized to retrieve the contents of a pocket;

FIG. 8 is a view similar to FIG. 7 but illustrating the snagger member of the embodiment of FIGS. 1–3 being used to snag the interior of a pocket and pull the pocket through the pocket opening to position the pocket inside out externally of the pocket opening;

MODES FOR CARRYING OUT THE INVENTION

Figure 2:
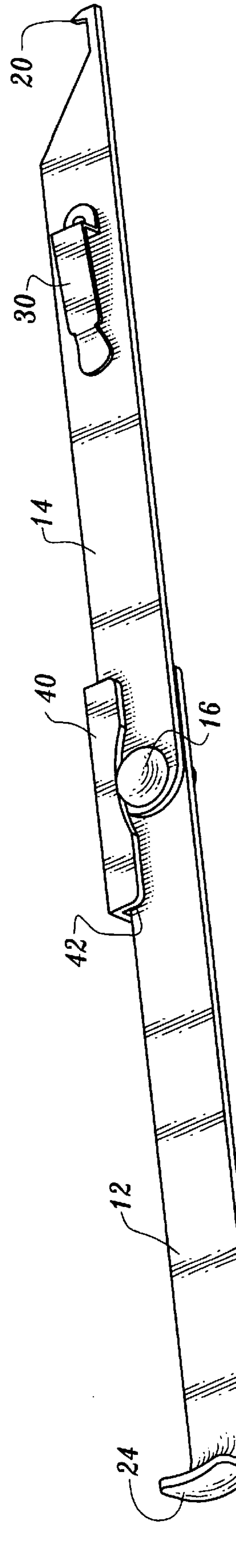
FIG. 2 is a perspective view of the apparatus with the handle portions thereof configured for use.
Figure 3:
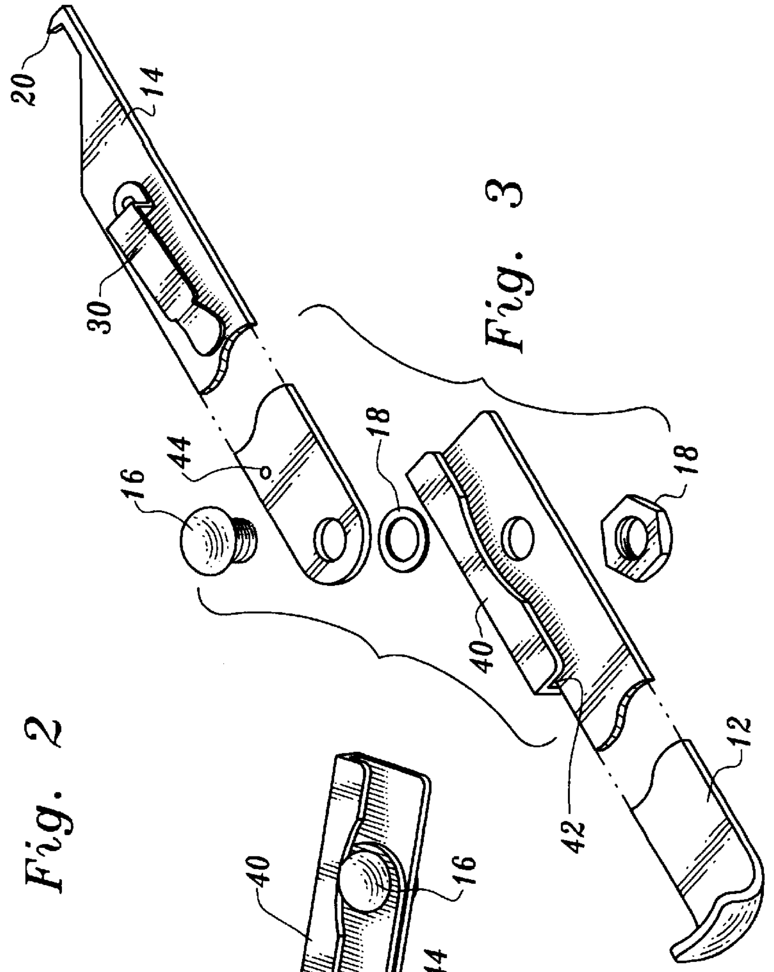
FIG. 3 is an exploded view illustrating components of the apparatus.

Referring now to FIGS. 1–3, 6 and 7, a preferred form of apparatus constructed in accordance with the teachings of the present invention is illustrated. The apparatus includes a handle 10 having two pivotally connected handle portions 12, 14. The pivotal attachment is accomplished by a pivot pin 16 which passes through openings formed at ends of the handle portions and is threadedly engaged with or otherwise secured to a nut 18. In the arrangement illustrated (see FIG. 3), a washer 18 is disposed between the two handle portions. It will be appreciated that any suitable arrangement may be employed to pivotally interconnect the handle portions. Furthermore, the handle portions and other structure of the apparatus may be formed of any suitable material such as metal or plastic.

Attached to the distal end of handle portion 14 is a snagger member in the form of a projection 20 which has a pointed end.

Attached to the distal end of handle portion 12 is a scoop member 24 which is curved to define a recess 26.

Figure 1:
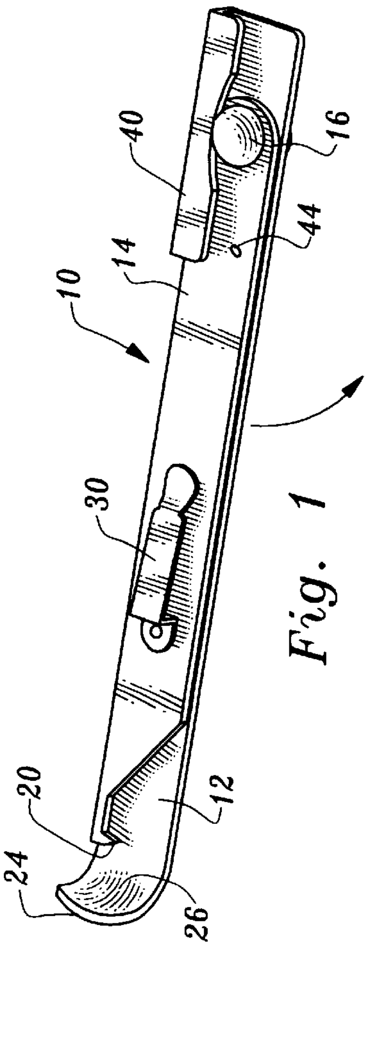
FIG. 1 is a perspective view of a preferred embodiment of the invention in collapsed condition.

The handle portions 12, 14 are movable between two configurations, that shown in FIG. 1 wherein the handle portions overlap along a common axis and wherein the snagger member and the scoop member are closely adjacent to one another on one side of the pivot pin 16, and a second configuration, shown in FIG. 2, for example, wherein the handle portions project away from one another, are located on opposed sides of the pivot pin 16 and are disposed along a common axis.

When the handle portions are in the configuration shown in FIG. 1 the apparatus is compact and may readily be carried or stored. A clip 30 may be utilized to retain the apparatus on a desired support such as a belt.

Attached to handle portion 12 is a retention member 40 defining an opening 42 with handle portion 12. It will be appreciated that the retention member 40 is engaged by handle portion 14 when handle portion 14 is disposed in either position shown in FIGS. 1 and 2. The retention member thus will stabilize the handle portions and retain them in the desired configuration. In the arrangement illustrated, a detent 44 is formed on handle portion 14 which will cooperate with a correspondingly sized indent (not shown) on the underside of the over-hanging lip of the retention member to provide additional stability when the handle portions are in the configuration of FIG. 2.

FIG. 7 shows the apparatus retrieving contents of a pocket with scoop member 24.

In FIG. 8, the snagger member has snagged the inner pocket structure to pull the pocket inside out and position it above the pocket opening 46.

Figures 4, 5, 6:
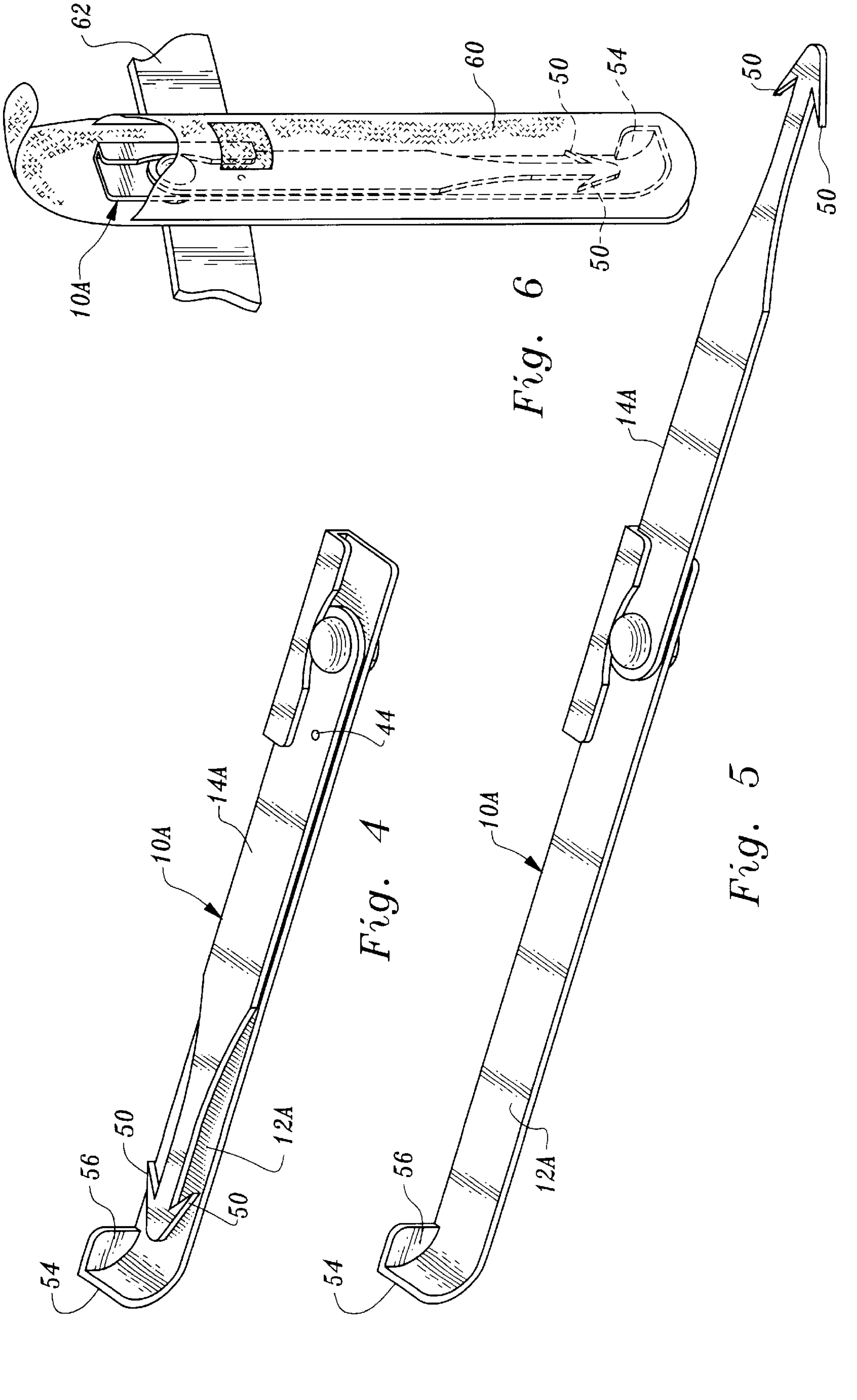
FIG. 4 is a view similar to FIG. 1 but illustrating an alternative embodiment of the invention.
FIG. 5 is a view similar to FIG. 2 but illustrating the alternative embodiment of FIG. 4.
FIG. 6 shows a holster holding the embodiment of FIG. 4 when the handle portions thereof are in the configuration shown in FIG. 4.
Figure 9:
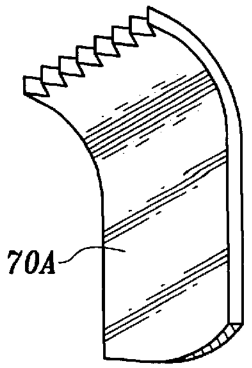
FIGS. 9–19 illustrate alternative forms of snagger members which can be employed in the apparatus.
Figure 10:
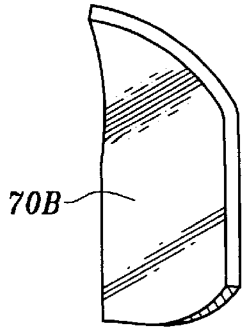
Figure 11:
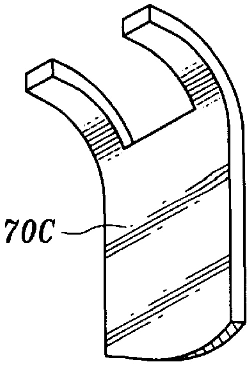
Figure 12:
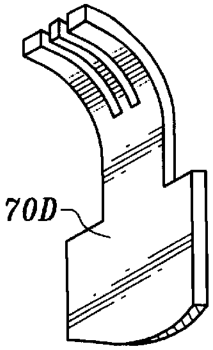
Figure 13:
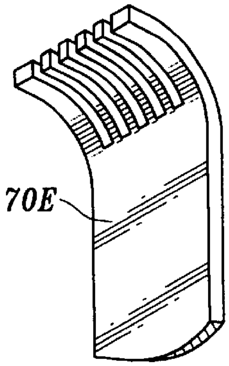
Figure 14:
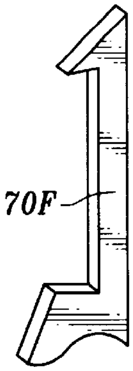
Figure 15:
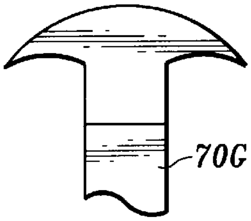
Figure 16:
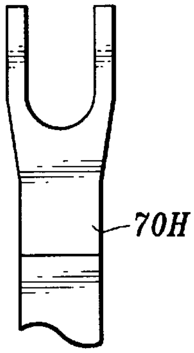
Figure 17:
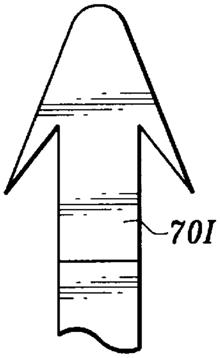
Figure 18:
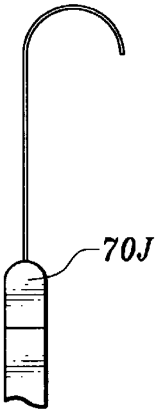

FIGS. 4–6 illustrate another embodiment of the invention including handle 10A and handle portions 12A and 14A wherein the snagger member is in the form of two hooks or sharp projections 50. The scoop member 54 is open at one side thereof and has a wall 56 at the other side thereof.

This embodiment does not incorporate a clip such as clip 30 of the first embodiment. FIG. 6 illustrates a holster 60 deployed on a belt 62 for receiving the collapsed handle portions and covering the associated snagger member and scoop member.

Figure 19:
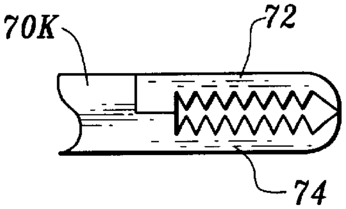
Figure 20:
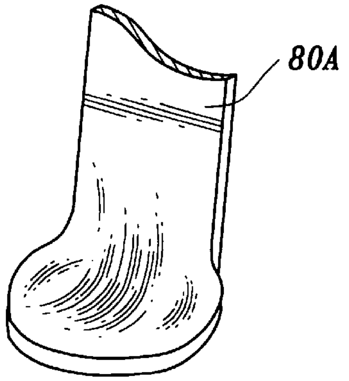
FIGS. 20–27 illustrate alternative scoop members which can be employed in the apparatus.
Figure 21:
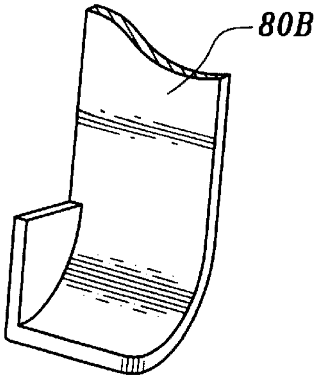
Figure 22:
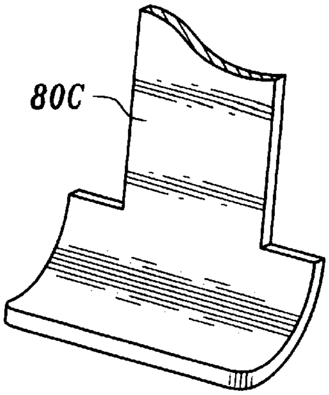
Figure 23:
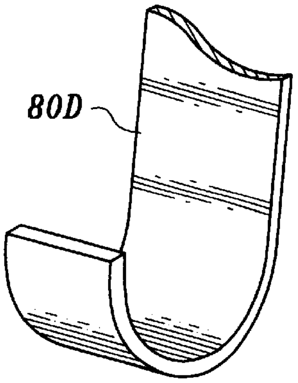
Figure 24:
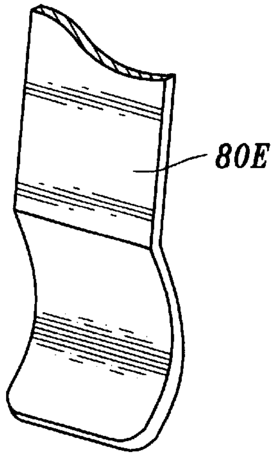
Figure 25:
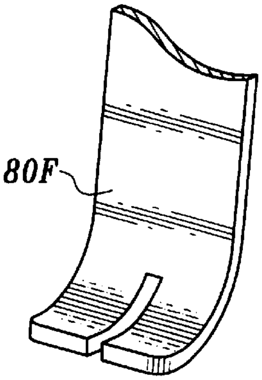
Figure 26:
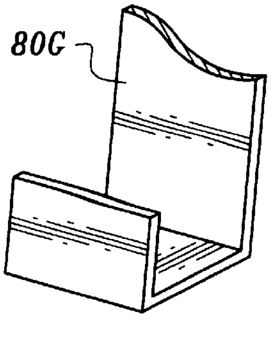
Figure 27:
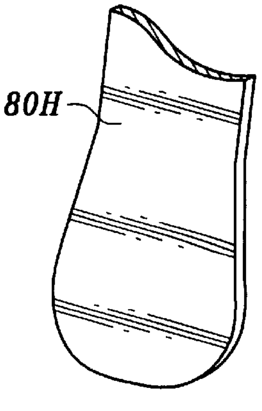

FIGS. 9 through 18 disclose different forms of snagger members, snagger members 70A–70J, which may be employed. These are representative only, it being understood that other forms of snagger members may be utilized. FIG. 19, for example, illustrates a snagger member 70K incorporating two pliers-type elements 72, 74 having a series of projections or teeth formed thereon to snag the pocket fabric. The snagger members may be employed to handle evidence and to snag and retrieve items in spaces other than pocket interiors.

FIGS. 20–27 illustrate alternative forms of scooper members 80A–80H which may be employed to extract the contents of a pocket or other confined spaces. Again, these shapes are representative only and other configurations could be utilized without departing from the spirit or scope of the invention as disclosed and claimed herein. In addition, other forms of the invention other than disclosed herein are possible. For example, the handle portions may telescope relative to one another and/or be spring loaded for relative movement.

What is claimed is:

1. Hand held apparatus for use by an individual inspecting a pocket of an article of clothing and for retrieving the contents thereof without the individual's hand engaging the pocket or being inserted into the pocket, said apparatus comprising, in combination:

a manually graspable handle;

a snagger member attached to said handle having a size and configuration enabling the snagger member to be readily inserted into the interior of a pocket through a pocket opening by manual manipulation of said handle, said snagger member for snagging the pocket and for pulling the pocket through the pocket opening to position the pocket inside out externally of the pocket opening when the handle is pulled in a direction leading away from the pocket, said snagger member comprising at least one projection having a pointed end projecting outwardly from said handle, said projection being oriented so that said pointed end does not snag the pocket as the snagger member is inserted into the pocket; and a scoop member attached to said handle at a location spaced from said snagger member having a size and configuration enabling the scoop member to be readily inserted into the interior of a pocket through a pocket opening by manual manipulation of said handle, said scoop member for scooping up contents of the pocket into which it is inserted and retrieving the contents through the pocket opening when the handle is manually pulled in a direction leading away from said pocket, said scoop member defining a recess open in an upward direction when the scoop member is in the interior of the pocket for accommodating pocket contents, said handle being elongated and having two spaced handle ends, said snagger member being attached to said handle at one of said ends and said scoop member being attached to said handle at the other of said ends, and said handle comprising pivotally connected handle portions, each said handle portion having a distal end spaced from the location of pivotal connection thereof, said snagger member being attached to the distal end of one of said handle portions and said scoop member being attached to the distal end of the other of said handle portions, said handle portions relatively movable to alternatively assume either a first configuration or a second configuration, said first configuration being shorter than said second configuration, and said snagger member and said scoop member being closely adjacent to one another when said handle portions are in said first configuration; and means for releasably selectively retaining said handle portions in either said first configuration or in said second configuration.

2. The apparatus according to claim 1 wherein said handle portions overlap when in said first configuration and wherein said handle portions when in said second configuration project away from one another, are located on opposed sides of said pivotal connection and are disposed along a common axis.

3. The apparatus according to claim 2 additionally comprising a holster for receiving the handle portions when said handle portions are in said first configuration.

4. The apparatus according to claim 1 additionally comprising a clip attached to said handle for supporting said apparatus when not in use.

* * * * *